United States Patent
Shankarappa et al.

(10) Patent No.: US 9,571,411 B1
(45) Date of Patent: Feb. 14, 2017

(54) USING A FIREWALL FILTER TO SELECT A MEMBER LINK OF A LINK AGGREGATION GROUP

(71) Applicant: Juniper Networks, Inc., Sunnyvale, CA (US)

(72) Inventors: Divakar Shankarappa, Bangalore (IN); Raja Krishnamoorthy, Bangalore (IN); Sharath Sridhar, Bangalore (IN); Amit Shukla, Sunnyvale, CA (US); Xiangwen Xu, Saratoga, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 102 days.

(21) Appl. No.: 14/584,089

(22) Filed: Dec. 29, 2014

(51) Int. Cl.
*H04L 12/891* (2013.01)
*H04L 12/801* (2013.01)
*H04L 12/935* (2013.01)
*H04L 12/911* (2013.01)

(52) U.S. Cl.
CPC .............. *H04L 47/41* (2013.01); *H04L 47/18* (2013.01); *H04L 47/745* (2013.01); *H04L 49/3081* (2013.01)

(58) Field of Classification Search
CPC .............. H04W 36/00; H04W 76/025; H04W 36/0083; H04W 36/26; H04L 45/123; H04L 45/245; H04L 47/41; H04L 69/14
See application file for complete search history.

(56) References Cited

U.S. PATENT DOCUMENTS

| | | | | |
|---|---|---|---|---|
| 9,160,673 B1* | 10/2015 | Lang | .................. | H04L 47/29 |
| 2005/0226235 A1* | 10/2005 | Kumar | .................. | H04L 29/06 370/386 |
| 2009/0219835 A1* | 9/2009 | Bandholz | .............. | H04L 12/462 370/255 |
| 2012/0087372 A1* | 4/2012 | Narasimhan | .......... | H04L 45/245 370/392 |
| 2013/0028072 A1* | 1/2013 | Addanki | ............... | H04L 49/557 370/218 |
| 2014/0105001 A1* | 4/2014 | Smith | ..................... | H04L 45/00 370/221 |
| 2014/0198793 A1* | 7/2014 | Allu | ....................... | H04L 45/245 370/392 |

OTHER PUBLICATIONS

Wikipedia, "Internet protocol suite," http://en.wikipedia.org/wiki/Internet_protocol_suite, Dec. 19, 2014, 13 pages.
Wikipedia, "Link aggregation," http://en.wikipedia.org/wiki/Link_aggregation, Nov. 10, 2014, 10 pages.
Wikipedia, "Network packet," http://en.wikipedia.org/wiki/Network_packet, Nov. 10, 2014, 9 pages.

* cited by examiner

*Primary Examiner* — Benjamin H Elliott, IV
(74) *Attorney, Agent, or Firm* — Harrity & Harrity, LLP (57) ABSTRACT

A device may store, in a data structure, a set of link identifiers, that identifies a set of member links included in a link aggregation group, in association with a set of packet parameters. The device may receive a network packet. The device may determine a particular packet parameter, of the set of packet parameters, associated with the network packet. The device may route the network packet via a particular member link, of the set of member links, identified by the particular link identifier.

20 Claims, 8 Drawing Sheets

USING A FIREWALL FILTER TO SELECT A MEMBER LINK OF A LINK AGGREGATION GROUP

BACKGROUND

A network may require a high bandwidth connection between network devices in the network. A link aggregation group (LAG) may bundle multiple links in parallel to form a single logical link in order to achieve higher bandwidth than any one link could provide. Also, the LAG may provide redundancy in case one of the links should fail. One or more member links may be included in the LAG. A member link may include a wired (e.g., optical fiber, electrical wire, etc) or wireless link capable of transmitting one or more network packets between network devices.

SUMMARY

According to some possible implementations, a system may include one or more devices. The one or more devices may receive a plurality of link identifiers that identify a plurality of member links included in a link aggregation group. The one or more devices may receive a plurality of packet parameters associated with the plurality of link identifiers. The one or more devices may store, in a data structure, the plurality of packet parameters in association with the plurality of link identifiers. The one or more devices may receive a network packet. The one or more devices may determine a particular packet parameter associated with the network packet. The plurality of packet parameters may include the particular packet parameter. The one or more devices may determine, using the data structure, a particular link identifier, of the plurality of link identifiers, associated with the particular packet parameter. The one or more devices may route the network packet via a particular member link of the plurality of member links included in the link aggregation group and identified by the particular link identifier.

According to some possible implementations, a device may include one or more processors. The one or more processors may store, in a data structure, a set of link identifiers, that identifies a set of member links included in a link aggregation group, in association with a set of packet parameters. The one or more processors may receive a network packet. The one or more processors may determine a particular packet parameter, of the set of packet parameters, associated with the network packet. The one or more processors may route the network packet via a particular member link, of the set of member links, identified by the particular link identifier.

According to some possible implementations, a method may include receiving, by a device, a plurality of link identifiers corresponding to a plurality of member links included in a link aggregation group. The method may include receiving, by the device, a plurality of packet parameters associated with the plurality of link identifiers. The method may include storing, by the device, in a data structure, the plurality of packet parameters in association with the plurality of link identifiers. The method may include receiving, by the device, a network packet. The method may include determining, by the device, a packet parameter, of the plurality of packet parameters, associated with the network packet. The method may include determining, by the device and using the data structure, a link identifier, of the plurality of link identifiers, associated with the packet parameter. The method may include outputting, by the device, the network packet via a member link, of the plurality of member links included in the link aggregation group, identified by the link identifier.

DETAILED DESCRIPTION

The following detailed description of example implementations refers to the accompanying drawings. The same reference numbers in different drawings may identify the same or similar elements.

A network device may route and/or switch a network packet to another network device via a link aggregation group (LAG). A network packet may refer to a communication structure for communicating information, such as a protocol data unit (PDU), a packet, a frame, a datagram, a segment, a message, a block, a cell, a subframe, a slot, a symbol, a portion of any of the above, and/or another type of formatted or unformatted unit of data capable of being transmitted via a network. The network device may select a member link of the LAG using a hash algorithm.

The hash algorithm may refer to a function that assists the network device in selecting a member link based on a packet parameter of the network packet (e.g., an Internet Protocol (IP) address associated with the network packet, a Media Access Control (MAC) address associated with the network packet, etc.). A packet parameter may include an entry in a field of a network packet and/or may include a characteristic of the network packet. But, the hash algorithm may not accept packet parameters that indicate traffic class, type of service, or other such packet parameters that may better meet a user's business requirements for aggregating and/or routing network traffic. Also, the hash algorithm may select a member link in a dynamic manner that gives inadequate control to the user. In addition, the hash algorithm may select a particular member link too often, which may result in overloading of the member link and disruption in routing the network packet. Implementations described herein may facilitate selecting a member link of a LAG using a firewall filter that accepts a broad array of packet parameters, that allows adequate user control over member link selection, and/or that helps in avoiding overloading of a member link.

Figure 1:
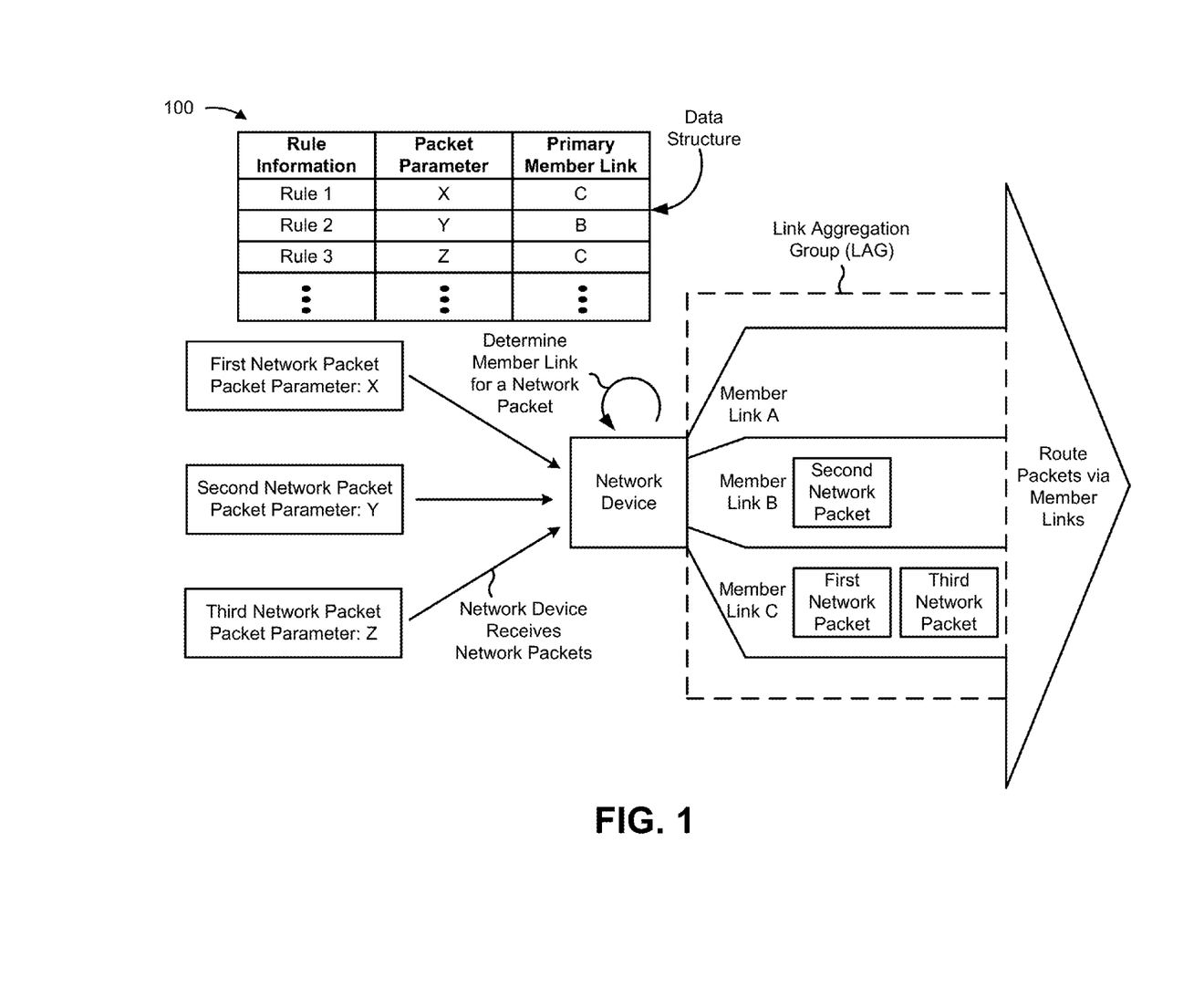
FIG. 1 is a diagram of an overview of an example implementation described herein.

FIG. 1 is a diagram of an overview of an example implementation 100 described herein. Assume that example implementation 100 includes a network device (e.g., a router, a switch, a firewall, a server, or the like), a LAG that includes three member links (e.g., shown as member link A, member link B, and member link C), three network packets (e.g., shown as first network packet, second network packet, and third network packet), and a data structure (e.g., a forwarding table, a routing table, etc.) stored by the network device. Assume that the network device is capable of routing the three network packets using a firewall filter that is based on the data structure. A firewall filter may refer to a set of rules (e.g., stored in a data structure) that specify an action to be performed for a network packet based on a packet parameter of the network packet. As shown, the data structure may include a set of rules that match a packet parameter to a member link to be used to route a network packet associated with the packet parameter. The set of rules may reflect a user's preferences regarding various types of network packets (e.g., the user's preferences may be based on the user's business requirements).

As shown in FIG. 1, the network device may receive the first network packet, the second network packet, and the third network packet. The network device may determine that the first network packet is associated with a packet parameter "X," that the second network packet is associated with a packet parameter "Y," and that the third network packet is associated with a packet parameter "Z". Assume that "X," "Y," and "Z" represent packet parameters drawn from a broad array of fields that indicate a type of service, a traffic class, an IP address, or the like. As shown, the network device may determine, based on the set of rules, a member link of the LAG that is associated with packet parameters of the three network packets. For example, assume that the network device determines that packet parameter "X" is associated with member link C, packet parameter "Y" is associated with member link B, and packet parameter "Z" is associated with member link C. Accordingly, the network device may route the first network packet via member link C, may route the second network packet via member link B, and may route the third network packet via member link C. In some implementations, the network device may route the three network packets to another device, such as another network device.

In this way, a network device may use a firewall filter to select a member link of a LAG in order to be able to accept a broad array of packet parameters, in order to allow the user adequate control over member link selection, and/or in order to help in avoiding overloading of a member link. Thus, member link selection using a firewall filter may allow the user to better control the performance capabilities of a network.

Figure 2:
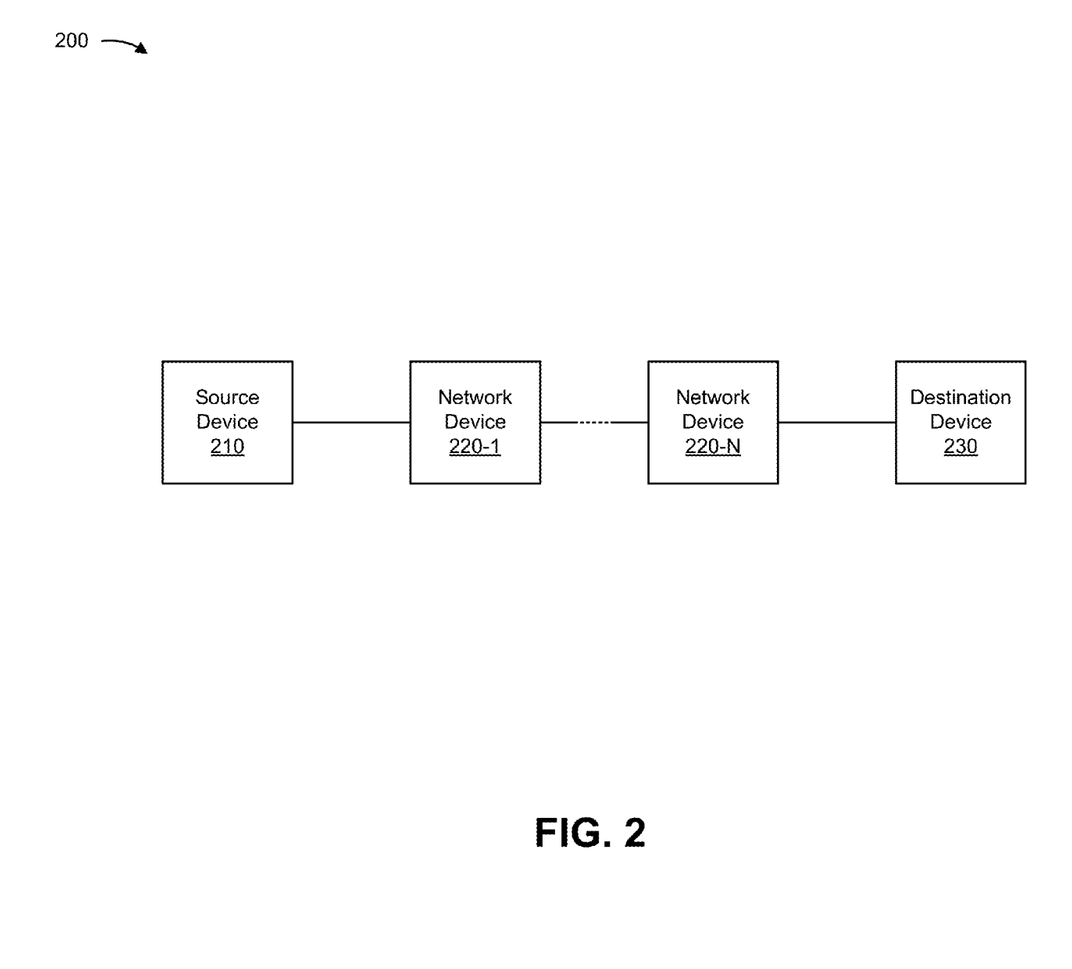
FIG. 2 is a diagram of an example environment in which systems and/or methods, described herein, may be implemented.

FIG. 2 is a diagram of an example environment 200 in which systems and/or methods described herein may be implemented. As shown in FIG. 2, environment 200 may include a source device 210, one or more network devices 220-1 through 220-N (N≥1) (hereinafter referred to collectively as "network devices 220" and individually as "network device 220"), and a destination device 230. Devices of environment 200 may interconnect via wired connections, wireless connections, or a combination of wired and wireless connections.

Source device 210 may include one or more devices capable of generating, processing, and/or providing one or more network packets. Source device 210 may include one or more devices capable of providing one or more network packets for transmission to destination device 230 via one or more network devices 220. For example, source device 210 may include a user device (e.g., a computer, a mobile device, etc.), a server device, an access point, an edge device, a gateway, or the like. In some implementations, source device 210 may provide a network packet to network device 220 for transmission to destination device 230. In some implementations, source device 210 may be associated with a particular network address, a particular port number, a particular transmission protocol, or the like. In some implementations, there may be multiple source devices 210 providing one or more network packets to network device 220.

Network device 220 may include one or more devices capable of receiving, generating, processing, storing, and/or providing one or more network packets. Network device 220 may include one or more devices capable of receiving one or more network packets from source device 210 and providing one or more network packets toward destination device 230. For example, network device 220 may include one or more traffic transfer devices, such as a router, a gateway, a server, a hub, a switch, a bridge, a network interface card (NIC), an optical add-drop multiplexer (OADM), an Ethernet device, an Ethernet back haul (EBH) device, or the like. In some implementations, network device 220 may route and/or switch, via a LAG, one or more network packets from source device 210 to destination device 230 or to another network device 220.

Destination device 230 may include one or more devices capable of receiving, processing, and/or storing one or more network packets. Destination device 230 may include one or more devices capable of receiving one or more network packets from source device 210 (e.g., via one or more network devices 220). For example, destination device 230 may include a user device (e.g., a computer, a mobile device, etc.), a server, an access point, a gateway, an edge device, or the like. In some implementations, destination device 230 may receive one or more network packets from source device 210 (e.g., via network device(s) 220).

The number and arrangement of devices and networks shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
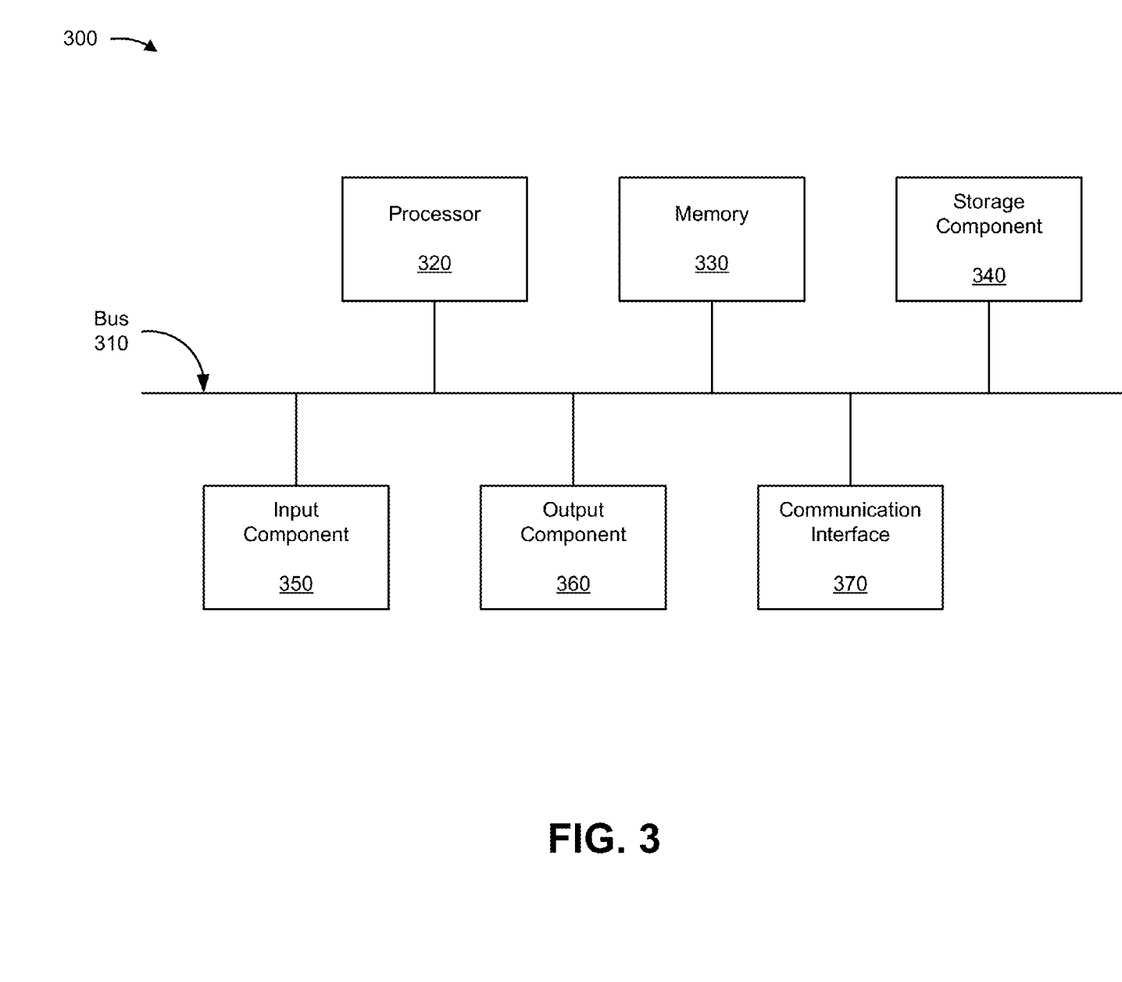
FIG. 3 is a diagram of example components of one or more devices of FIG. 2.

FIG. 3 is a diagram of example components of a device 300. Device 300 may correspond to source device 210, network device 220, and/or destination device 230. In some implementations, source device 210, network device 220, and/or destination device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
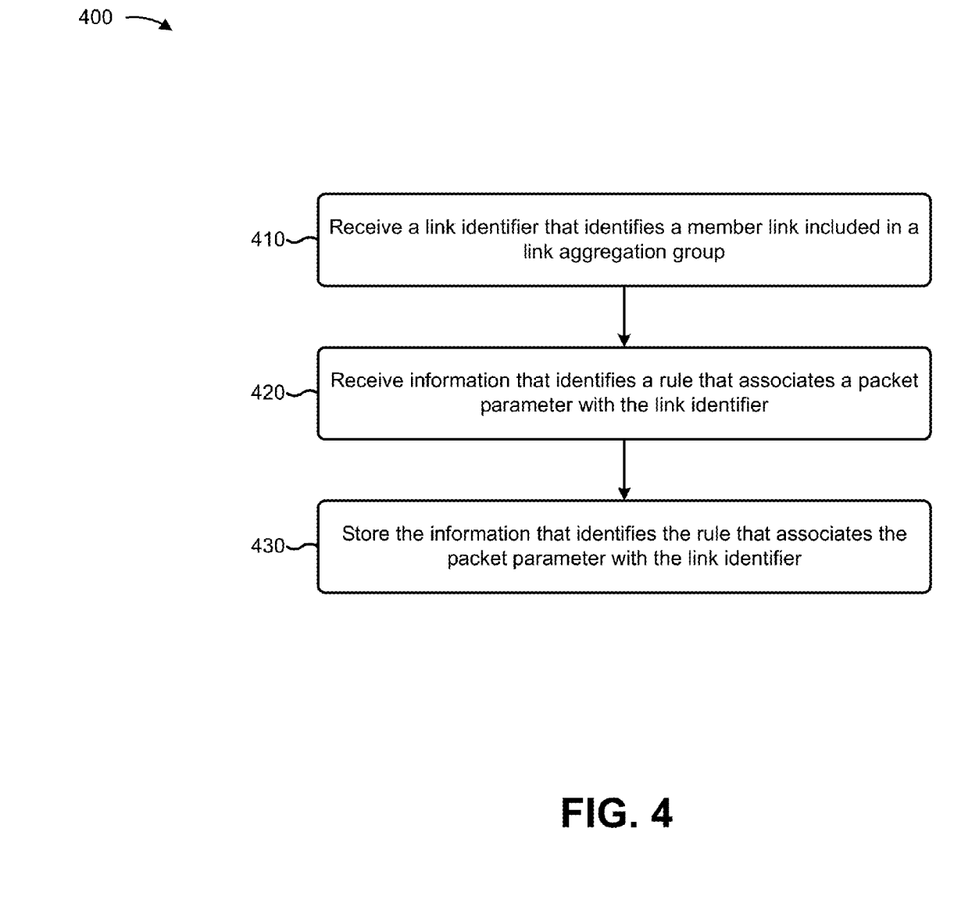
FIG. 4 is a flow chart of an example process for receiving and storing information that identifies a rule that associates a packet parameter of a network packet with a link identifier that identifies a member link of a link aggregation group.

FIG. 4 is a flow chart of an example process 400 for receiving and storing information that identifies a rule that associates a packet parameter of a network packet with a link identifier that identifies a member link. In some implementations, one or more process blocks of FIG. 4 may be performed by network device 220. In some implementations, one or more process blocks of FIG. 4 may be performed by another device or a set of devices separate from or including network device 220, such as source device 210 and/or destination device 230.

As shown in FIG. 4, process 400 may include receiving a link identifier that identifies a member link included in a link aggregation group (block 410). For example, network device 220 may receive a link identifier that identifies a member link included in a LAG. A link identifier may include a character string of any length or another identifier that uniquely identifies a particular member link within a LAG (e.g., the link identifier may identify a single member link). In some implementations, network device 220 may receive the link identifier from an input device that has received an input from a user (e.g., a network operator). In some implementations, the user may input the link identifier directly to network device 220 (e.g., via a console, an interface, or the like). In some implementations, network device 220 may assign the link identifier to a member link or may generate the link identifier for the member link based on an inspection of the LAG. Network device 220 may inspect the LAG, after network device 220 is connected to the LAG, using a bot that is capable of sensing member links or by routing sample network packets via the LAG.

As further shown in FIG. 4, process 400 may include receiving information that identifies a rule that associates a packet parameter with the link identifier (block 420). For example, network device 220 may receive information that identifies a rule that associates a packet parameter with the link identifier (e.g., a rule that indicates a relationship between a packet parameter and the link identifier). A rule may include a relationship indicator that indicates a relationship between a packet parameter of a network packet and a link identifier (e.g., by indicating the link identifier that identifies a member link to be used to route the network packet associated with the packet parameter). A firewall filter may include a set of rules (e.g., stored in a data structure) that specifies an action to be performed for a network packet based on a packet parameter of the network packet.

A packet parameter may include an entry in a field of a network packet and/or may include a characteristic of the network packet. The packet parameter may indicate a source of the network packet, a destination of the network packet, a size of the network packet, a type of traffic to which the network packet belongs (e.g., video traffic, audio traffic, mobile traffic, etc.), or some other characteristic of the network packet. For example, the following is a non-exhaustive list of possible valid inputs for a packet parameter for a firewall filter: information associated with a fragment (e.g., a characteristic of a first fragment, fragment flags (in symbolic or hex formats), fragment offset, whether a packet is a fragment, etc.), information associated with the flexibility of packet matching using a flexible mask, a flexible range, etc. (e.g., allowing pattern matches at custom, user-defined locations within a network packet without the need for fixed or pre-defined fields), a characteristic of an interface which received and/or sent the network packet (e.g., interface name, interface group, interface set), source port, destination port, traffic class, source class, forwarding class, destination class, Type of Service (ToS), Quality of Service (QoS), traffic matching multicast group, source IP address, IP source prefixes in named list, destination IP prefix, destination IP address, IP options, IP Encapsulating Security Protocol (ESP), IP Security Parameter Index (SPI), IP precedence value, IP protocol type, or the like.

Also, the following is a continuation of the non-exhaustive list of possible valid inputs for a packet parameter for a firewall filter: information associated with Transmission Control Protocol (TCP) (e.g., source TCP, source TCP port, destination TCP, TCP flags in symbolic or hex formats, whether the packet is of an established TCP connection, TCP initial sequence number, etc.), information associated with User Datagram Protocol (e.g., source UDP, source UDP port, destination UDP, etc.), information associated with bypassing firewall filters, information associated with loss priority (e.g., priority of dropping packets), packet length, redirect reason, Differentiated Services Code Point (DSCP), Internet Control Message Protocol (ICMP) message code, ICMP message type, Radio Access Technology (RAT) type, Time To Live (TTL), Virtual Extensible Local Area Network (VXLAN), Open Shortest Path First (OSPF), or the like.

In some implementations, network device 220 may receive a set of rules that associate a packet parameter with multiple link identifiers, such as a primary link identifier, a secondary link identifier, or the like. A primary link identifier may identify a primary link that is a member link that has first priority for routing the network packet. A secondary link identifier may identify a secondary link that is a member link that has second priority for routing the network packet. If the primary link is available, network device 220 may route the network packet via the primary link. If the primary link is unavailable (e.g., because of a link error or failure), network device 220 may route the network packet via the secondary link (e.g., if the secondary link is available). In an analogous manner, a rule may indicate a relationship between a packet parameter and a tertiary link, a quaternary link, and so on.

In some implementations, a rule may include a relationship indicator that indicates a relationship between a link identifier and one or more conditions. In some implementations a condition may be based on one or more packet parameters of the network packet. For example, a condition may specify that a network packet be associated with a packet parameter that indicates a particular MAC address and be associated with a packet parameter that indicates video traffic. Additionally, or alternatively, when the condition is met, network device 220 may route the network packet via the member link identified by the link identifier associated with the condition (e.g., as specified in a rule).

In some implementations, a rule may associate a condition that is based on a single packet parameter with a link identifier. In some implementations, a rule may associate a condition that is based on multiple packet parameters with a link identifier. In such an implementation, a network packet may be required to be associated with the multiple packet parameters in order to meet the condition associated with a link identifier.

In some implementations, network device 220 may receive and/or use a mathematical formula that assists in calculating a score based on applying weights to multiple packet parameters. The score may be included in a condition that is associated with a link identifier. For example, network device 220 may receive and/or use a mathematical formula that applies four times as much weight to a packet parameter that indicates audio traffic than a packet parameter that indicates MAC address, packet length, or IP address. In such an example, a rule may indicate that a network packet is to be routed to a particular member link based on a score that weights a packet parameter that indicates audio traffic four times as much as the packet parameters that indicate MAC address, packet length, or IP address (e.g., audio traffic is favored, in the calculation, for routing via the particular member link and MAC address, packet length and IP address are disfavored for routing via the particular member link). In such an example, network device 220 may route the network packet via the particular member link because the packet parameter that indicates audio traffic contributes positive four (+4) while MAC address, packet length, and IP address contribute negative one (−1) each. In such an example, network device 220 may calculate a score of positive one (4−3=1). In such an example, positive scores may signal routing via the particular member link.

Additionally, or alternatively, a rule may apply only while the quantity of network packets having a certain packet parameter stays below a first threshold (e.g., satisfies a threshold). For example, a rule may specify that a particular link identifier may apply only when less than ten thousand network packets, associated with a packet parameter that indicates video traffic, have been routed via a member link identified by the particular link identifier. In some implementations, a rule may apply only if the quantity of network packets with a certain packet parameter rises above a second threshold (e.g., a threshold that may be equal to the first threshold or different from the first threshold).

As further shown in FIG. 4, process 400 may include storing the information that identifies the rule that associates the packet parameter with the link identifier (block 430). For example, network device 220 may store the information that identifies the rule that associates the packet parameter with the link identifier. In some implementations, network device 220 may store the information that identifies the rule in a data structure (e.g., a forwarding table, a routing table, or the like). Additionally, or alternatively, network device 220 may provide the information that identifies the rule to other network devices 220 in a network. In this way, network device 220 may receive and store information that identifies a rule that associates a packet parameter of a network packet with a link identifier that identifies a member link.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
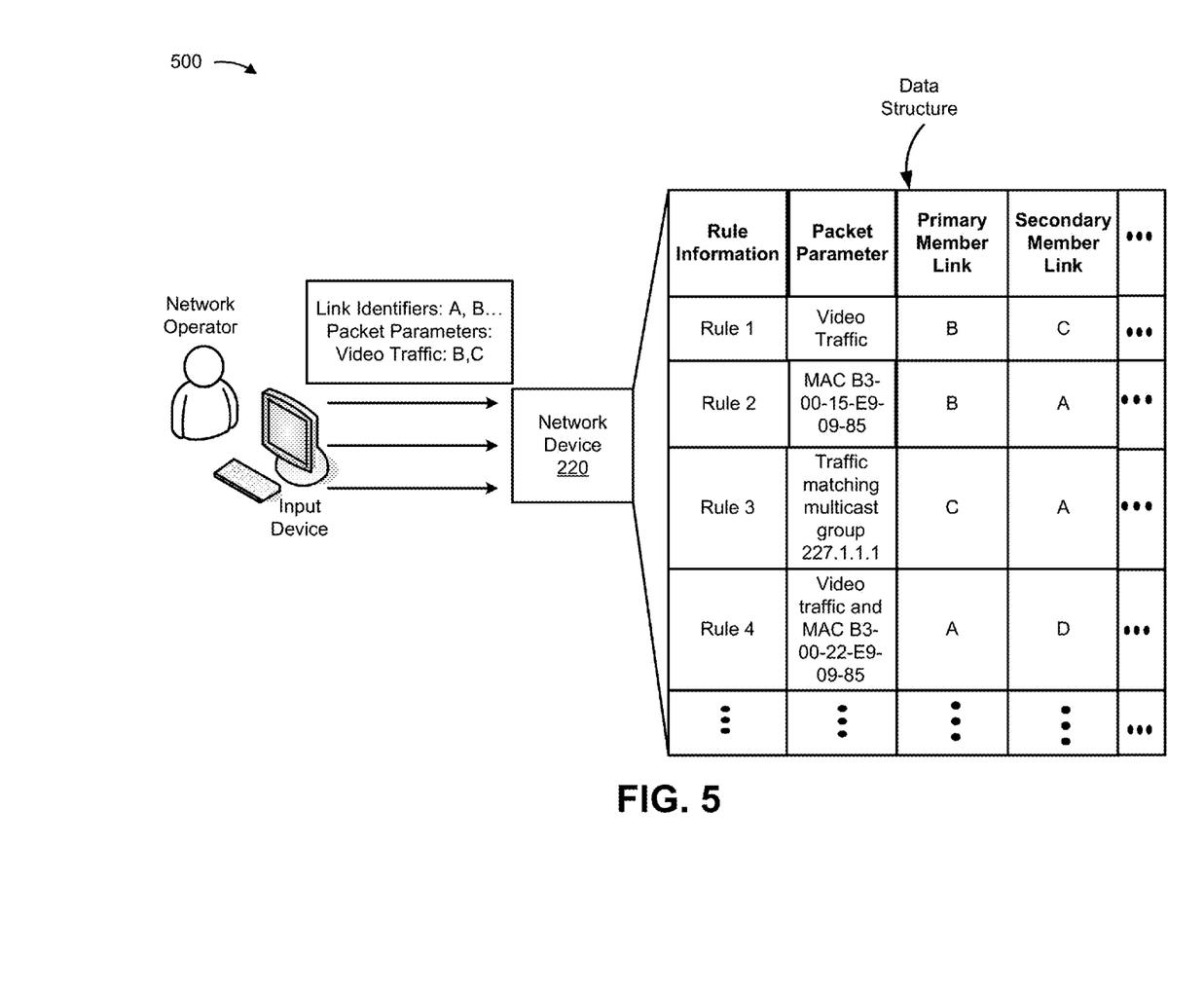
FIG. 5 is a diagram of an example implementation relating to the example process shown in FIG. 4.

FIG. 5 is a diagram of an example implementation 500 relating to example process 400 shown in FIG. 4. FIG. 5 shows an example of receiving and/or storing information that identifies a set of rules that associate a packet parameter of a network packet with a link identifier that identifies a member link of a link aggregation group.

As shown in FIG. 5, assume that implementation 500 includes network device 220 and an input device (e.g., a desktop computer, a laptop computer, etc). Assume further that network device 220 is in communication with the input device. Assume further that four member links (e.g., member link A, member link B, member link C, and member link D) are included in a link aggregation group.

As further shown in FIG. 5, a user inputs four link identifiers (e.g., shown as "Link Identifiers: A, B . . . ") into network device 220 via the input device. Network device 220 receives the link identifiers. A user inputs information that identifies a set of rules into network device 220 via the input device (e.g., shown as "Video Traffic: B, C"). A rule may match or associate one or more packet parameters (or a condition based on one or more packet parameters) with a link identifier that identifies a member link. Network device 220 stores the information that identifies the set of rules in a data structure.

Assume further that routed primarily refers to routing by a primary link, routed secondarily refers to routing by a secondary link, and so on. As further shown in FIG. 5, the following information that identifies a set of rules is received by network device 220: Rule 1: A network packet associated with a packet parameter that indicates the presence of video traffic is to be routed primarily by member link B and secondarily by member link C; Rule 2: a network packet associated with a packet parameter that includes MAC address B3-00-15-E9-09-85 is to be routed primarily by member link B and secondarily by member link A; Rule 3: a network packet associated with a packet parameter that includes traffic matching multicast group 227.1.1.1 is to be routed primarily by member link C and secondarily by member link A; and Rule 4: a network packet associated with a packet parameter that indicates the presence of video traffic and includes MAC address B3-00-22-E9-09-85 is to be routed primarily by member link A and secondarily by member link D. Network device 220 receives other information that identifies other sets of rules (not shown) regarding the four member links as well as more detail about the four rules shown (e.g., network device 220 receiving information that identifies rules that include additional packet parameters, one or more conditions associated with a score based on applying weights, one or more conditions associated with routing via a primary link, a secondary link, etc.).

As indicated above, FIG. 5 is provided merely as an example. Other examples are possible and may differ from what was described with regard to FIG. 5.

Figure 6:
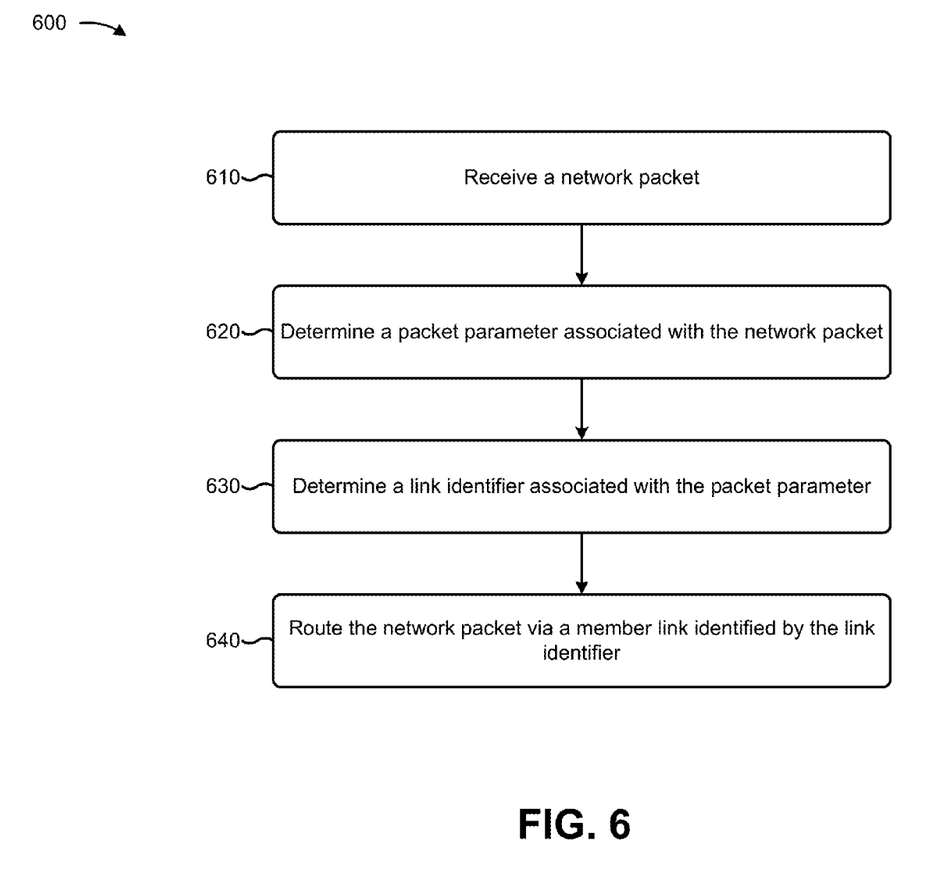
FIG. 6 is a flow chart of an example process for routing a network packet based on using a firewall filter to select a member link of a link aggregation group.

FIG. 6 is a flow chart of an example process 600 for routing a network packet based on using a firewall filter to select a member link of a link aggregation group. In some implementations, one or more process blocks of FIG. 6 may be performed by network device 220. In some implementations, one or more process blocks of FIG. 6 may be performed by another device or a set of devices separate from or including network device 220, such as source device 210 and/or destination device 230.

As shown in FIG. 6, process 600 may include receiving a network packet (block 610). For example, network device 220 may receive a network packet from source device 210 and/or another network device 220. In some implementations, network device 220 may receive the network packet via one or more wired or wireless links or a combination of wired and wireless links. In some implementations, an input device may receive an instruction that indicates whether network device 220 is to distribute one or more network packets to member links using a hash algorithm or using a firewall filter and may provide the instruction to network device 220. In some implementations, network device 220 may perform process 600 if the instruction indicates that network device 220 is to use the firewall filter. In some implementations, network device 220 may use the firewall filter as an alternative to using the hash algorithm. In some implementations, network device 220 may use the firewall filter for a first set of network packets and the hash algorithm for a second set of network packets.

As further shown in FIG. 6, process 600 may include determining a packet parameter associated with the network packet (block 620). For example, network device 220 may determine a packet parameter associated with the network packet. In some implementations, network device 220 may read data (e.g., text) from one or more fields (e.g., a packet header, a packet payload, etc.) of the network packet. In some implementations, network device 220 may read data from elsewhere within the network packet. Additionally, or alternatively, network device 220 may read data from a pre-configured list of fields of the network packet. In some implementations, when determining the packet parameter, network device 220 may determine one or more packet parameters from the pre-configured list of fields. Additionally, or alternatively, network device 220 may not determine an associated link identifier (as described below in connection with block 630) until network device 220 reads data from the pre-configured list of fields. For example, network device 220 may be configured to read a packet parameter that indicates MAC address and a packet parameter that indicates video traffic before determining a link identifier. In some implementations, the pre-configured list of fields may be based on instructions received from an input device.

The packet parameter may be determined by reading the packet parameter from the network packet, by looking up the packet parameter using information from the network packet, and/or by generating the packet parameter using information from the network packet. In some implementations, the types of packet parameters that may be used for the firewall filter is more diverse than the types of packet parameters that may be used by the hash algorithm. A more diverse array of available packet parameters may allow a user (e.g., a network operator) to better customize routing of network packets according to business requirements and allow the user to better customize distribution of network packets in order to avoid overloading a member link.

As further shown in FIG. 6, process 600 may include determining a link identifier associated with the packet parameter (block 630). For example, network device 220 may determine a link identifier associated with the packet parameter. In some implementations, network device 220 may determine the link identifier associated with the packet parameter by utilizing a data structure (e.g., the data structure that includes the information that identifies the set of rules stored by network device 220, as described above in connection with block 430 of FIG. 4). In some implementations, network device 220 may determine, based on the packet parameter, a link identifier that identifies a primary link, a link identifier that identifies a secondary link, a link identifier that identifies a tertiary link, or the like.

In some implementations, network device 220 may determine the link identifier using a rule that associates one or more conditions to the link identifier. In some implementations, network device 220 may determine the link identifier using a rule that includes a condition that is based on a single packet parameter or based on multiple packet parameters. Additionally, or alternatively, network device 220 may determine the link identifier using a rule that includes a condition that includes a score based on applying weights to multiple packet parameters. In some implementations, network device 220 may determine the link identifier using a rule that applies only while a quantity of network packets, having a certain packet parameter, stays below a first threshold (e.g., satisfies a first threshold). Additionally, or alternatively, network device 220 may determine the link identifier using a rule that applies only if the quantity of network packets, having a certain packet parameter, rises above a second threshold (e.g., satisfies a second threshold).

As further shown in FIG. 6, process 600 may include routing the network packet via a member link identified by the link identifier (block 640). For example, network device 220 may route the network packet via a member link identified by the link identifier. If a primary link is available, network device 220 may route the network packet via the primary link. If the primary link is unavailable (e.g., because of a link error or failure), network device 220 may route the network packet via a secondary link (e.g., if the secondary link is available). Network device 220 may determine the availability of the primary link and the secondary link by inspecting the LAG, after network device 220 is connected to the LAG, using a bot that is capable of sensing member links or by routing sample network packets via the member links. In an analogous manner, network device 220 may route the network packet via a tertiary link (e.g., if the primary and secondary links are unavailable), a quaternary link (if the primary, secondary, and tertiary links are unavailable), and so on.

In some implementations, the set of rules stored in the data structure may specify the distribution of network packets in a balanced manner that requires each member link to route approximately the same quantity of network packets (e.g., per unit of time). A balanced distribution may be easier to achieve since a diverse array of packet parameters are available as inputs into the firewall filter that distributes the network packets. The balanced distribution may assist in avoiding overloading of a member link.

In some implementations, a link identifier may be associated with multiple packet parameters (e.g., multiple packet parameters may need to be associated with a network packet in order for the network packet to be routed via a member link identified by a link).

In some implementations, a default setting of the firewall filter may be to route the network packet via a default member link unless a rule specifies otherwise. Additionally, or alternatively, a default setting of the firewall filter may be to discard the network packet unless a rule specifies otherwise. Additionally, or alternatively, a default setting of the firewall filter may be to distribute one or more network packets among multiple default member links unless a rule specifies otherwise.

In some implementations, network device 220 may route, via the member link of the LAG, the network packet to another network device 220 and/or to a destination device 230. In this way, network device 220 may route the network packet based on selecting a member link of a link aggregation group using a firewall filter that accepts a broad array of packet parameters, that allows adequate user control over member link selection, and/or that helps in avoiding overloading of a member link.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
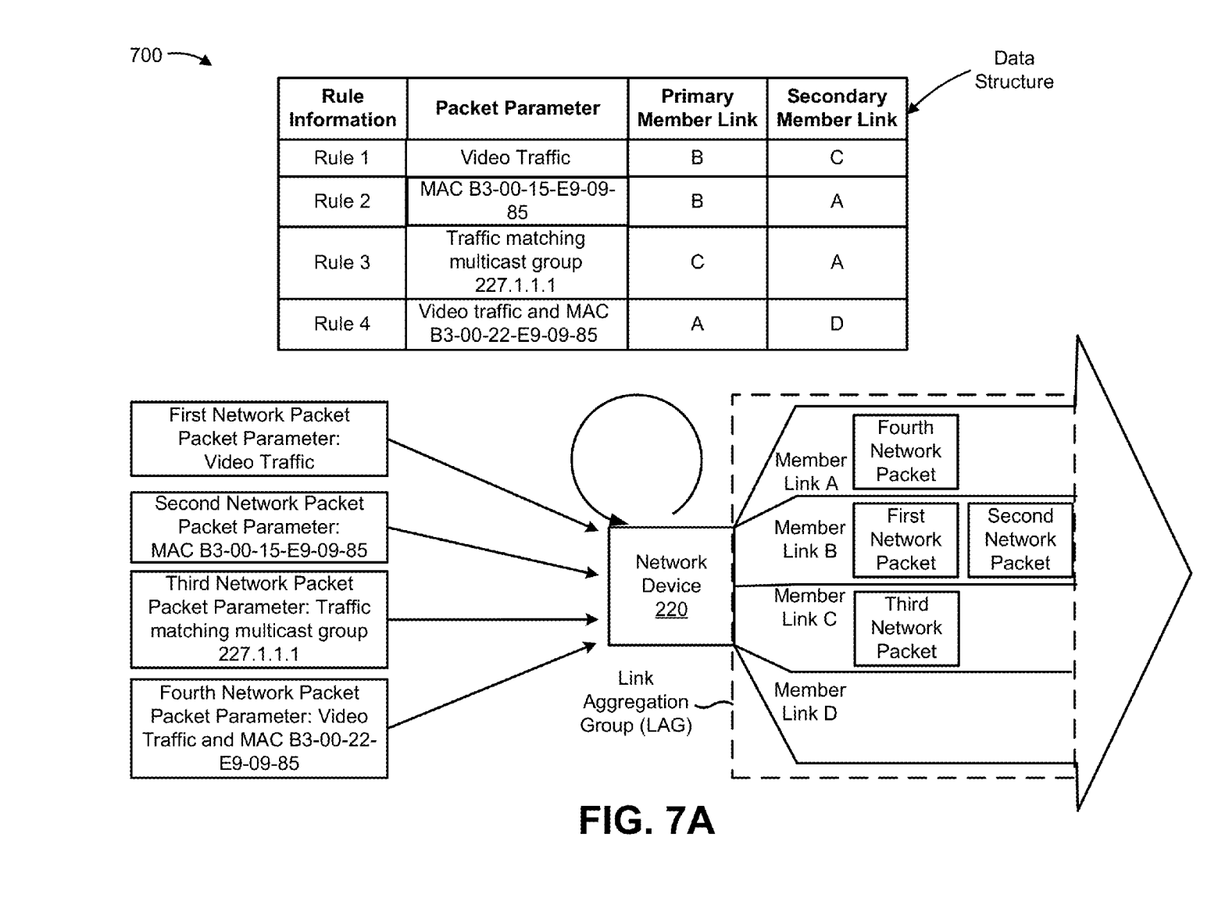
FIGS. 7A and 7B are diagrams of an example implementation relating to the example process shown in FIG. 6.
Figure 7B:
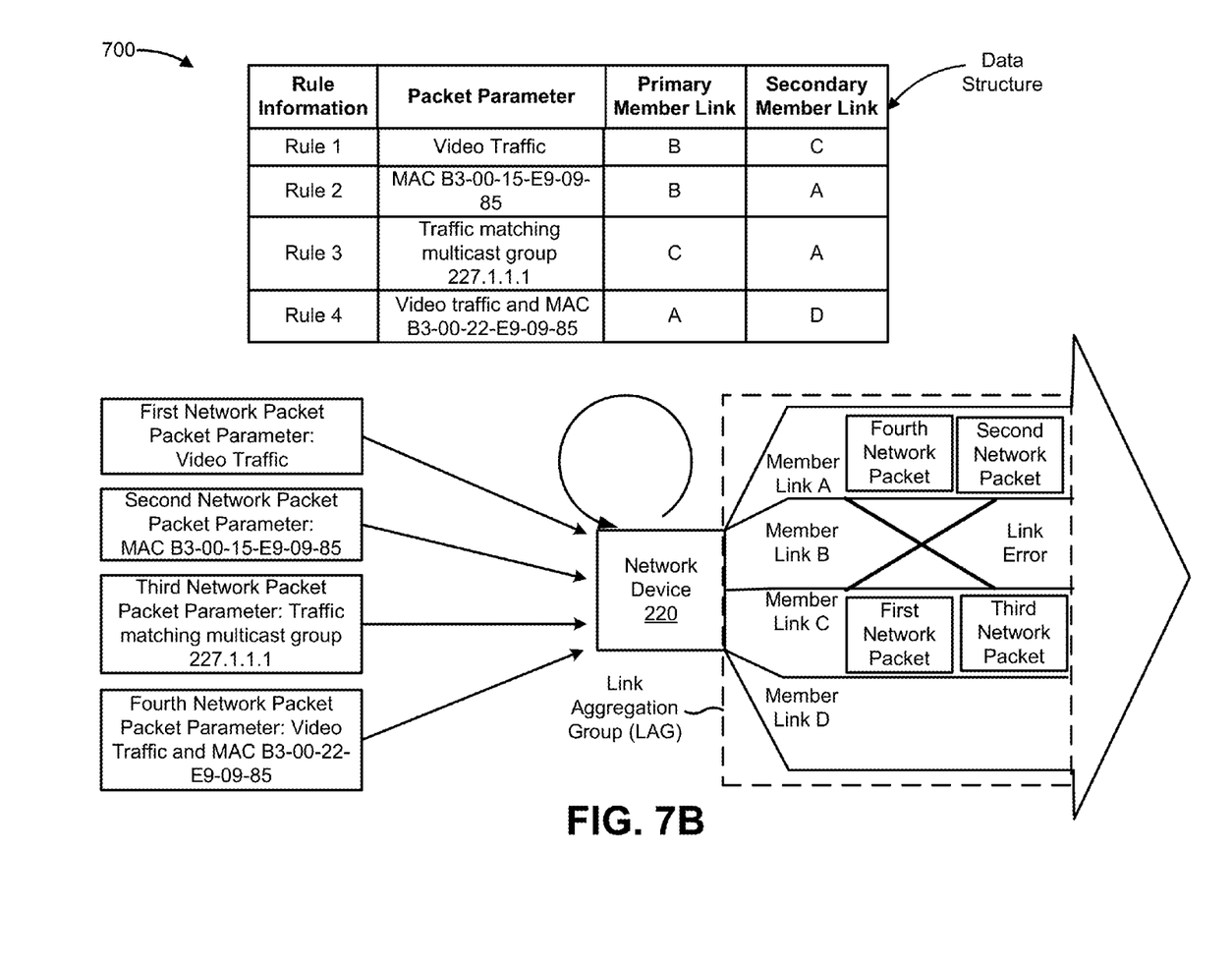

FIGS. 7A and 7B are diagrams of an example implementation 700 relating to example process 600 shown in FIG. 6. FIGS. 7A and 7B show an example of routing a network packet based on using a firewall filter to select a member link of a link aggregation group.

As shown in FIG. 7A, assume that implementation 700 includes a network device 220, a link aggregation group with four member links, and a data structure (e.g., the data structure stored by network device 220, as shown in FIG. 5). As shown, network device 220 receives a first network packet, a second network packet, a third network packet, and a fourth network packet. Network device 220 determines that a packet parameter associated with the first network packet indicates a presence of video traffic, a packet parameter associated with the second network packet indicates a MAC address of B3-00-15-E9-09-85, a packet parameter associated with the third network packet indicates a traffic matching multicast group of 227.1.1.1, and a packet parameter associated with the fourth network packet indicates a presence of video traffic and a MAC address of B3-00-22-E9-09-85. Assume further that network device 220 has received a pre-configured list fields of a network packet that are to be used to determine one or more packet parameters before network device 220 determines a link identifier associated with the network packet. Assume further that the pre-configured list of fields includes a packet parameter that indicates whether the network packet is a part of video traffic, a packet parameter that indicates a MAC address, and a packet parameter that indicates a traffic matching multicast group.

As further shown, network device 220 utilizes the data structure to look up a primary link associated with a packet parameter and a secondary member link associated with the packet parameter. Network device 220 determines that member link B is the primary link associated with the first network packet's packet parameter, and network device 220 routes the first network packet via member link B. Network device 220 determines that member link B is the primary link associated with the second network packet's packet parameter, and network device 220 routes the second network packet via member link B (e.g., because member link B is available). Network device 220 determines that member link C is the primary link associated with the third network packet's packet parameter, and network device 220 routes the third network packet via member link C. Network device 220 determines that member link A is the primary link associated with the fourth network packet's packet parameters, and network device 220 routes the fourth network packet via member link A. In this way, network device 220 may route one or more network packets via a member link that is selected using the data structure of a firewall filter.

As shown in FIG. 7B, assume that member link B experiences a link error and becomes unavailable. Network device 220 determines that member link B has become unavailable by routing sample network packets via member link B. Network device 220 utilizes the data structure to look up a primary link associated with a packet parameter and a secondary member link associated with a packet parameter. As shown, network device 220 determines that member link B is the primary link associated with the first network packet's packet parameter and member link C is the secondary member link associated with the first network packet's packet parameter. Because member link B is unavailable (e.g., due to the link error), network device 220 routes the first network packet via member link C, which is the secondary member link of the first network packet.

As shown, network device 220 determines that member link B is a primary link associated with the second network packet's packet parameter and member link A is a secondary member link associated with the second network packet's packet parameter. Because member link B is unavailable, network device 220 routes the second network packet via member link A, which is the secondary member link of the second network packet.

As shown, network device 220 determines that member link C is the primary link associated with the third network packet's packet parameter, and network device 220 routes the third network packet via member link C, since member link C is available. As shown, network device 220 determines that member link A is the primary link associated with the fourth network packet's packet parameters, and network device 220 routes the fourth network packet via member link A, since member link A is available. In this way, network device 220 may route a network packet based on using a data structure of a firewall filter to select a member link when one or more primary links are unavailable. Selecting a secondary link when a primary link is unavailable reduces disruptions in routing of network packets.

As indicated above, FIGS. 7A and 7B are provided merely as an example. Other examples are possible and may differ from what was described with regard to FIGS. 7A and 7B.

Implementations described herein may assist in routing a network packet based on using a firewall filter to select a member link of a link aggregation group, thereby allowing a greater diversity of packet parameters to be taken into account, allowing adequate user control over routing the network packet, reducing the chances of overloading a member link, and/or providing back-up member links in case of a link error.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items and unrelated items, or the like), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A system, comprising:
   one or more devices to:
   receive a plurality of link identifiers that identify a plurality of member links included in a link aggregation group;
   receive a plurality of packet parameters associated with the plurality of link identifiers;
   store, in a data structure, the plurality of packet parameters in association with the plurality of link identifiers;
   receive a network packet;
   determine multiple packet parameters associated with the network packet,
      the plurality of packet parameters including the multiple packet parameters;
   determine a score based on the multiple packet parameters;
   determine, using the data structure and based on the score, a particular link identifier, of the plurality of link identifiers, associated with the multiple packet parameters; and
   route the network packet via a particular member link of the plurality of member links included in the link aggregation group and identified by the particular link identifier.

2. The system of claim 1,
   where the one or more devices, when determining the particular link identifier, are to:
   determine a first link identifier, of the plurality of link identifiers, that identifies a first member link of the plurality of member links; and
   determine a second link identifier, of the plurality of link identifiers, that identifies a second member link of the plurality of member links; and
   where the one or more devices, when routing the network packet, are to:
   determine whether the first member link is available; and
   selectively route the network packet based on determining whether the first member link is available,
      the network packet being routed via the first member link when the first member link is available, and
      the network packet being routed via the second member link when the first member link is unavailable.

3. The system of claim 1, where a packet parameter, of the plurality of packet parameters, comprises a valid input for a firewall filter of the one or more devices.

4. The system of claim 1, where the one or more devices, when determining the multiple packet parameters, are to:
   determine the multiple packet parameters based on at least one of:
   reading a particular packet parameter of the multiple packet parameters from the network packet,
   looking up the particular packet parameter using information from the network packet, or
   generating the particular packet parameter using information from the network packet.

5. The system of claim 1, where the one or more devices, when determining the particular link identifier, are to:
   determine the particular link identifier without using a hash algorithm.

6. The system of claim 1, where the one or more devices, when determining the score, are to:
   determine the score based on applying a weight to a parameter of the multiple packet parameters.

7. The system of claim 1,
where the one or more devices, when determining the particular link identifier, are to:
determine, based on the data structure and the score, a first link identifier, of the plurality of link identifiers, that identifies a first member link of the plurality of member links; and
where the one or more processors, when routing the network packet, are to:
determine whether a quantity of network packets of a first set of network packets satisfies a threshold,
the first set of network packets being network packets that are associated with the multiple packet parameters and that have been routed via the particular member link; and
selectively route the network packet based on determining whether the quantity of network packets of the first set of network packets satisfies the threshold,
the network packet being routed via the first member link when the quantity of network packets of the first set of network packets satisfies the threshold.

8. A device, comprising:
one or more processors to:
store, in a data structure, a set of link identifiers, that identifies a set of member links included in a link aggregation group, in association with a set of packet parameters;
receive a network packet;
determine multiple packet parameters, of the set of packet parameters, associated with the network packet;
determine a score based on the multiple packet parameters;
determine, using the data structure and based on the score, a particular link identifier, of the set of link identifiers, associated with the multiple packet parameters; and
route the network packet via a particular member link, of the set of member links, identified by the particular link identifier.

9. The device of claim 8,
where the one or more processors, when determining the particular link identifier, are to:
determine a primary link identifier, of the set of link identifiers, that identifies a primary link of the set of member links; and
determine a secondary link identifier, of the set of link identifiers, that identifies a secondary link of the set of member links; and
where the one or more processors, when routing the network packet, are to:
determine whether the primary link is available; and
selectively route the network packet based on determining whether the primary link is available,
the network packet being routed via the primary link when the primary link is available, and
the network packet being routed via the secondary link when the primary link is unavailable.

10. The device of claim 8,
where the one or more processors, when determining the particular link identifier, are to:
determine, based on the data structure and the score, a first link identifier, of the set of link identifiers, that identifies a first member link of the set of member links; and
where the one or more processors, when routing the network packet, are to:
determine whether a quantity of network packets of a first set of network packets satisfies a threshold,
the first set of network packets being network packets that are associated with the multiple packet parameters and that have been routed via the particular member link; and
selectively route the network packet based on determining whether the quantity of network packets of the first set of network packets satisfies the threshold,
the network packet being routed via the first member link when the quantity of network packets of the first set of network packets satisfies the threshold.

11. The device of claim 8,
where the one or more processors are further to:
determine a condition that includes the score,
the score being based on applying a weight to a parameter of the multiple packet parameters; and
where the one or more processors, when determining the particular link identifier, are to:
determine the particular link identifier based on the condition.

12. The device of claim 8, where the one or more processors are further to:
receive, from an input device, information that includes the set of link identifiers in association with the set of packet parameters,
the information being input to the input device by a user.

13. The device of claim 8,
where the one or more processors are further to:
receive, from an input device, an instruction to select a member link, of the set of member links, using a firewall filter; and
where the one or more processors, when determining the particular link identifier, are to:
determine, based on receiving the instruction, the particular link identifier using the firewall filter.

14. The device of claim 8,
where the one or more processors, when determining the multiple packet parameters, are to:
read a particular packet parameter of the multiple packet parameters from the network packet,
look up the particular packet parameter using information from the network packet, or
generate the particular packet parameter using information from the network packet.

15. A method, comprising:
receiving, by a device, a plurality of link identifiers corresponding to a plurality of member links included in a link aggregation group;
receiving, by the device, a plurality of packet parameters associated with the plurality of link identifiers;
storing, by the device, in a data structure, the plurality of packet parameters in association with the plurality of link identifiers;
receiving, by the device, a network packet;
determining, by the device, multiple packet parameters, of the plurality of packet parameters, associated with the network packet;
determining, by the device, a score based on the multiple packet parameters;
determining, by the device, using the data structure, and based on the score, a link identifier, of the plurality of link identifiers, associated with the multiple packet parameters; and outputting, by the device, the network packet via a member link, of the plurality of member links included in the link aggregation group, identified by the link identifier.

16. The method of claim 15, where determining the link identifier comprises:
   determining the link identifier without using a hash algorithm.

17. The method of claim 15, further comprising:
   receiving a list of fields of the network packet,
      the fields including one or more packet parameters that are used to determine the link identifier; and
   reading data from the fields identified by the list of fields,
      where determining the link identifier comprises:
         determining the link identifier based on reading the data from the fields.

18. The method of claim 15, further comprising:
   determining a condition that includes the score,
      the score based on applying a weight to each of the multiple packet parameters, of the plurality of packet parameters, associated with the network packet,
      where determining the link identifier comprises:
         determining the link identifier based on the condition.

19. The method of claim 15,
   where determining the link identifier comprises:
      determining, based on the data structure and the score, a first link identifier, of the plurality of link identifiers, that identifies a first member link of the plurality of member links; and
   where outputting the network packet comprises:
      determining whether a quantity of network packets of a first set of network packets satisfies a threshold,
         the first set of network packets being network packets that are associated with the multiple packet parameters and that have been routed via the member link; and
      selectively routing the network packet based on determining whether the quantity of network packets of the first set of network packets satisfies the threshold,
         the network packet being routed via the first member link when the quantity of network packets of the first set of network packets satisfies the threshold.

20. The method of claim 15, where the link aggregation group includes a particular set of member links to be used for routing network packets associated with packet parameters not identified in the data structure.

* * * * *